(12) United States Patent
Judge

(10) Patent No.: US 6,718,298 B1
(45) Date of Patent: Apr. 6, 2004

(54) DIGITAL COMMUNICATIONS APPARATUS

(75) Inventor: Rupinder Judge, Binfield (GB)

(73) Assignee: Agere Systems Inc., Allentown, PA (US)

( * ) Notice: Subject to any disclaimer, the term of this patent is extended or adjusted under 35 U.S.C. 154(b) by 585 days.

(21) Appl. No.: 09/690,402

(22) Filed: Oct. 17, 2000

(30) Foreign Application Priority Data

Oct. 18, 1999 (EP) ............................................. 99308221

(51) Int. Cl.⁷ ............................................... G10L 21/02
(52) U.S. Cl. ....................................... 704/215; 704/233
(58) Field of Search ................................ 704/200, 201, 704/210, 215, 221, 233, 500, 504; 370/337; 455/501

(56) References Cited

U.S. PATENT DOCUMENTS

| | | | | |
|---|---|---|---|---|
| 4,376,874 A | | 3/1983 | Karban et al. ............ | 179/15.55 |
| 5,448,679 A | * | 9/1995 | Mckiel ...................... | 395/2.17 |
| 5,630,016 A | | 5/1997 | Swaminathan et al. .... | 395/2.37 |
| 5,812,965 A | | 9/1998 | Massaloux .................. | 704/205 |
| 5,835,889 A | * | 11/1998 | Kapanen ...................... | 704/215 |
| 5,978,759 A | * | 11/1999 | Tsushima et al. ........... | 704/223 |
| 6,038,238 A | * | 3/2000 | Jakinen et al. .............. | 370/523 |
| 6,381,568 B1 | * | 4/2002 | Supplee et al. ............. | 704/210 |
| 6,502,071 B1 | * | 12/2002 | Nagasaki ..................... | 704/226 |
| 6,519,260 B1 | * | 2/2003 | Glayas et al. .......... | 370/395.42 |

OTHER PUBLICATIONS

Anonymous "Compression Method for Voice Preprocessing and Postprocessing" IBM Technical Disclosure Bulletin, vol. 29, No. 4 Sep. 1, 1986, pp. 1756–1757.
European Search Report, dated Mar. 31, 2000.

* cited by examiner

*Primary Examiner*—Daniel Abebe

(57) ABSTRACT

Speech recording is effected in a GSM phone handset (100) by storing in a memory (116) speech frames during the presence of speech, one or more SID frames during the absence of speech, and data representative of the duration of the absence of speech. In this way memory (116) does not store silent speech frames, and utilisation of memory space is therefore particularly efficient. In addition, items such as a voice activity detector and a comfort noise estimator, which are already provided in the handset as part of the GSM system, are "re-used" by the invention, thereby making efficient use of already-provided hardware/software.

9 Claims, 3 Drawing Sheets

DIGITAL COMMUNICATIONS APPARATUS

CROSS-REFERENCE TO RELATED APPLICATION

Figure 1:
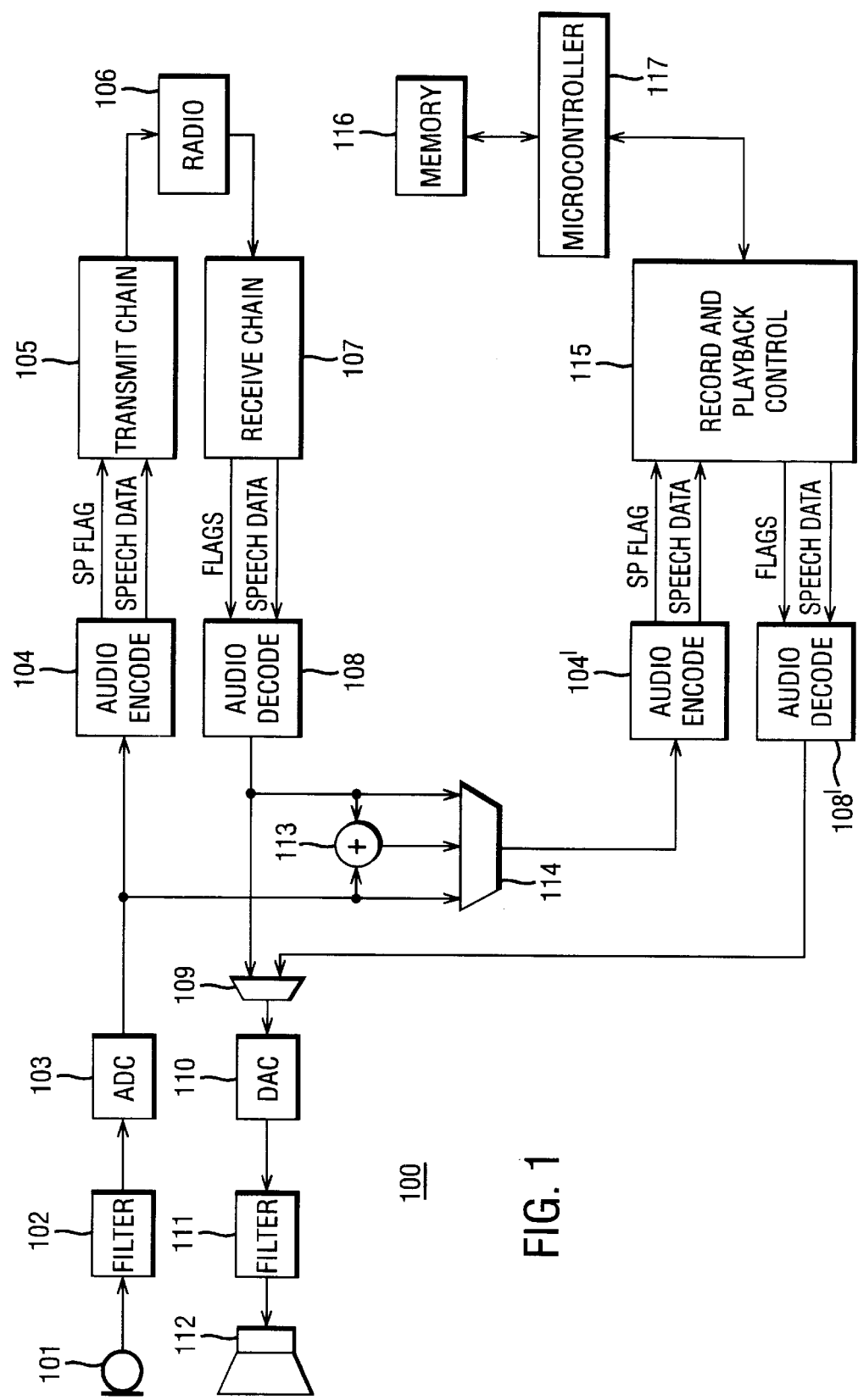

This application claims priority of European Patent Application No. 99308221.3, which was filed Oct. 18, 1999.

1. Field of the Invention

This invention relates to digital communications apparatus.

2. Description of the Related Art

A desirable feature in digital communication apparatus is the ability to record speech. In, for example, a digital mobile phone, this ability would enable the phone to act as a telephone answering machine, or to record a voice memo, or to record a conversation taking place over the telephone. An important consideration, particularly in a digital mobile phone, is the amount of memory that has to be provided for this purpose. Previous attempts at providing speech recording in a digital mobile phone have not made efficient use of memory space, and thus required either an unacceptably large memory, or utilised a smaller memory which was insufficient for some purposes.

SUMMARY OF THE INVENTION

According to one aspect of this invention there is provided digital communications apparatus including a comfort noise estimator for providing silence frames containing information representative of background acoustic noise, a comfort noise generator for providing comfort noise for simulating background acoustic noise, and speech record/playback means adapted, on record, to store speech frames substantially only during the presence of speech, to store one or more silence frames at the end of the presence of speech, and to store data representative of the duration of the absence of speech, and adapted, on playback, to provide as output speech signals derived from the stored speech frames and, in dependence upon the stored one or more silence frames, comfort noise from the comfort noise generator for a duration represented by the stored data.

The apparatus may be a digital mobile phone including a transmitter adapted to be switched on only for transmission of frames containing useful information, and wherein the comfort noise generator is adapted to provide comfort noise in dependence upon silence frames when no speech frames are received.

The apparatus may include a speech encoder for encoding speech into speech frames and for providing input to the comfort noise estimator for providing said silence frames, whereby said speech frames stored by the speech record/playback means are those encoded by said speech encoder, and a speech decoder for decoding stored speech frames and for providing in the output of the speech decoder comfort noise generated by said comfort noise generator in dependence upon stored silence frames.

The digital mobile phone may be a Global System for Mobile Communications (GSM) phone.

Said stored data may comprise a count of speech frames occurring during the absence of speech.

Said stored data may comprise a respective dummy frame of minimal length for each speech frame occurring during the absence of speech.

According to another aspect of this invention there is provided a method of recording/playing back speech in digital communications apparatus, the method including, for recording, storing speech frames substantially only during the presence of speech, storing one or more silence frames, containing information representative of background acoustic noise, at the end of the presence of speech, and storing data representative of the duration of the absence of speech, and, for playback, providing as output speech signals derived from the stored speech frames and, in dependence upon the stored silence frame or frames, comfort noise for simulating background acoustic noise for a duration represented by the stored data.

Said stored data may comprise a count of speech frames occurring during the absence of speech.

Said stored data may comprise a respective dummy frame of minimal length for each speech frame occurring during the absence of speech.

BRIEF DESCRIPTION OF THE INVENTION

Figure 2:
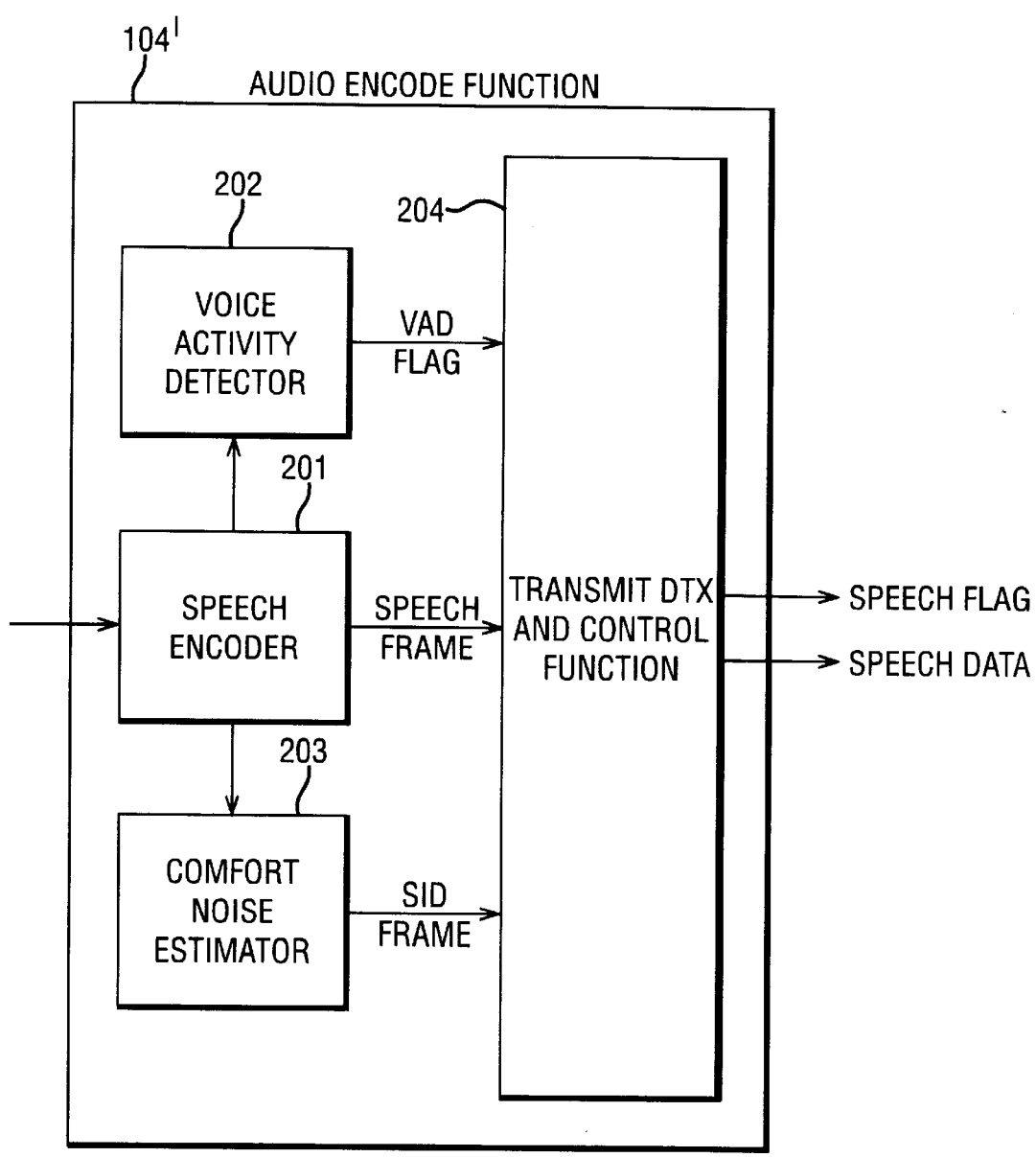
Figure 3:
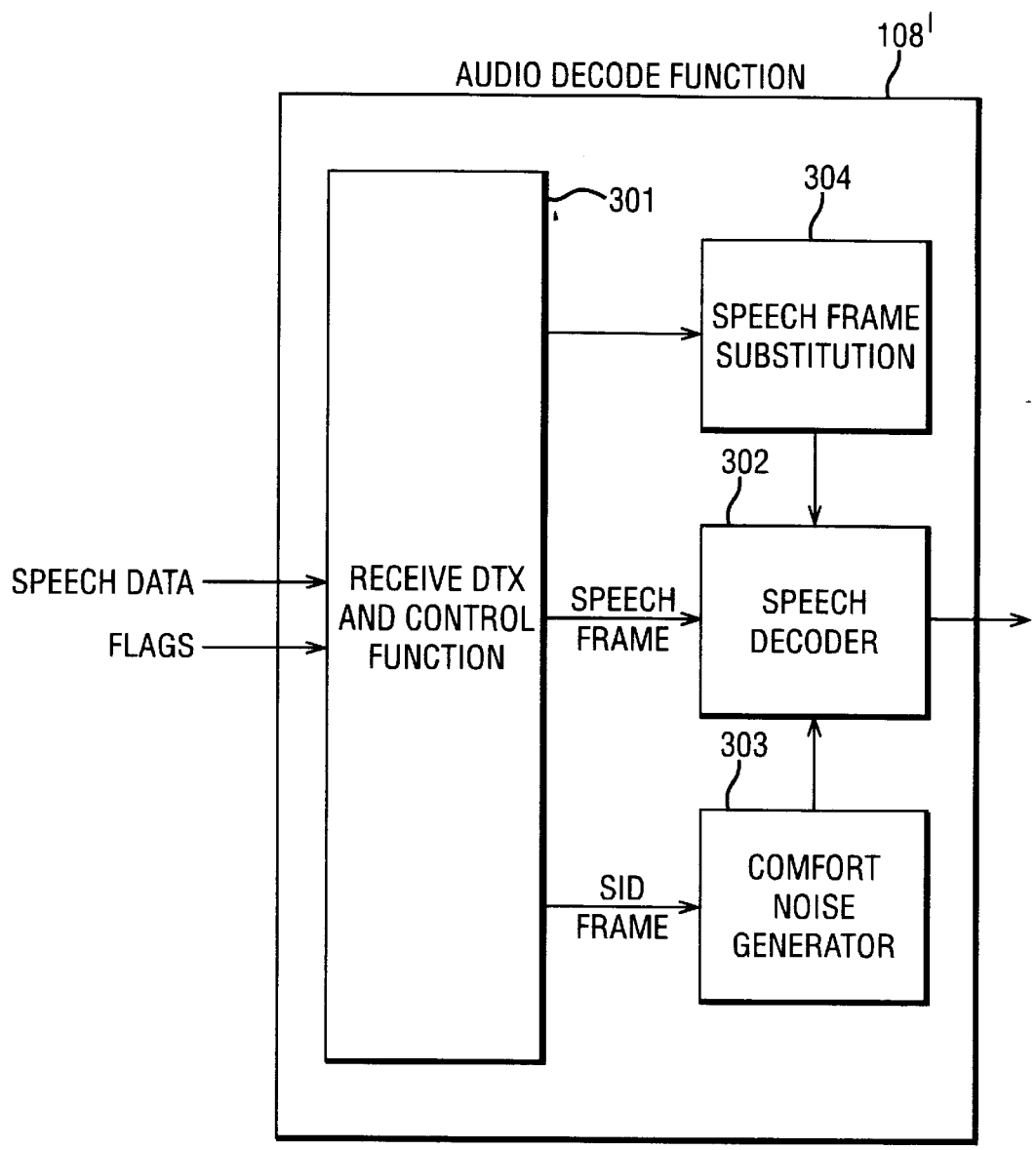

The invention will now be described by way of example with reference to the accompanying drawings, in which:

FIG. 1 is a schematic diagram of a GSM telephone embodying the invention; and FIGS. 2 and 3 are schematic diagrams showing in greater detail the Audio Encode function and the Audio Decode function, respectively, shown in FIG. 1.

DETAILED DESCRIPTION

During a normal telephone conversation, the participants alternate so that, on the average, each direction of transmission is occupied roughly 50% of the time. In the GSM system so called "discontinuous transmission" (DTX) is specified as a mode of operation whereby the transmitter is switched on only for those frames which contain speech or other useful information. This has the advantages that the average interference level "on air" is reduced, leading to better spectrum efficiency, and, in the mobile phone, battery life is prolonged, or a smaller battery may be used for a given operational duration. The achievement of the discontinuous transmission mode of operation requires a voice activity detector on the transmit side to detect absence of speech, an evaluation of the background acoustic noise on the transmit side in order to transmit characteristic parameters of the background noise to the receive side, and generation on the receive side of a similar noise, i.e., so called comfort noise, during periods when the radio transmission is cut.

The transmission of comfort noise characteristics to the receive side is achieved by means of a special frame, a so called silence descriptor frame, or SID frame. This frame is transmitted at the end of each speech burst and serves as an "end of speech" marker for the receive side. In order to update the comfort noise characteristics at the receive side, SID frames are also transmitted at regular intervals during speech pauses. This also serves the purpose of improving the measurement of the radio link quality by the radio subsystem.

In its application to a GSM phone, the present invention makes use of the voice activity detector, the comfort noise generator and various other components which are already present in the phone for the purpose of the discontinuous transmission mode of operation described above.

Referring now to FIG. 1, speech signals from normally-provided microphone 101 in a GSM handset 100 are passed via a filter 102 to an analog to digital converter 103, the digital output of which is provided to an Audio Encode Function block 104. The output of block 104, whose functions will be described in more detail with reference to FIG. 2, is provided as input to a Transmit Chain block 105 where the usual channel encoding, interleaving and modulation are effected. The output of block 105 is provided as input to a Radio block 106, comprising the usual radio frequency (RF) sections such as the power amplifier and antenna, for translation to an RF signal for transmission. Received signals at the output of the Radio block 106 are fed as input to a Receive Chain block 107 where the usual equalisation and channel decoding operations are performed to produce speech data and various flags indicative of the quality of the received signal (i.e. whether there are any errors in the speech and SID frames, and whether the speech data is a speech frame or a SID frame). The speech data and flags are fed as input to an Audio Decode function block 108. The output of block 108, whose functions will be described with reference to FIG. 3, is fed via a switch 109 as input to a digital-to-analog converter 110 whose analog output is fed via a filter 111 to an electroacoustic transducer 112, such as an earpiece or loudspeaker.

The input to Audio Encode function block 104 and the output from Audio Decode function block 108 are also fed as inputs to a summer 113 and to a switch 114. The output of summer 113 is also fed as input to switch 114. The output of switch 114 is fed as input to Audio Encode function block 104' which may be, and preferably is, a second instance of already-provided Audio Encode function block 104 which, as will be understood by those skilled in the art, is normally embedded in software in the digital signal processor, or DSP (not shown), in the GSM handset.

Referring now to FIG. 2, the input to Audio Encode function block 104' is fed to a Speech Encoder 201 which encodes the speech signals into speech frames. Signals from Speech Encoder 201 are fed to a Voice Activity Detector 202 which produces a signal, a so-called VAD flag, in response to the absence of speech. Signals from Speech Encoder 201 are also fed to a Comfort Noise Estimator 203 which produces SID frames which contains information representative of the background acoustic noise.

The VAD flag from Voice Activity Detector 202, speech frames from Speech Encoder 201 and SID frames from Comfort Noise Estimator 203 are fed to a Transmit DTX and Control block 204 which provides at its output speech data and a speech, or SP, flag indicative of whether the speech data output is a speech frame or a SID frame. Until Voice Activity Detector 202 detects the absence of speech, the speech data output comprises speech frames and the SP flag is indicative thereof. At the end of a speech burst it typically takes a time equal to N (N greater than 1) speech frames to compute a new SID frame. When, therefore, Voice Activity Detector 202 detects the absence of speech, the output of block 204 continues to comprise speech frames until the new SID frame becomes available whereupon it appears at the output of block 204 and the SP flag changes to indicate same. An exception to this arises when, at the end of a speech burst, less than M (M>1) frames have elapsed since the last SID frame was computed. In this situation the last SID frame is provided and the SP flag changes to indicate same. In effect, if the last SID frame is not too old, it is treated as being current and is therefore used, rather than waiting for a new one to be computed. This feature avoids the wait which would otherwise occur for a new SID frame to be computed in the case where a short background noise spike is taken for speech, thus reducing activity on the air.

Returning now to FIG. 1, the operation of Audio Encode function block 104 is similar to the operation just described for block 104'. As will be appreciated by those skilled in the art, block 104 may operate at half rate, full rate or enhanced full rate, depending on operational circumstances or requirements, whereas block 104' will normally operate at full rate. Block 104 serves to provide for transmission to a remote receiver, via Transmit Chain block 105 and Radio block 106, speech frames and SID frames and an SP flag indicative of whether the frames are speech or SID.

For record operation, the speech data and SP flag output of block 104' is provided to a Record and Playback Control block 115 which serves to decide what to store in a memory 116 via a microcontroller 117. Record and Playback Control block 115 causes to be stored in memory 116 all frames which are indicated as speech frames by the SP flag. When the SP flag indicates a SID frame, the first such SID frame is also stored in memory 116. Thereafter, there is no need to store any more frames until the SP flag again indicates a speech frame. When such an indication of a speech frame is received, block 115 causes to be stored in memory 116 data representative of the duration of the intervening absence of speech. Preferably such data is a count of speech frames not stored in memory 116, i.e. a count of speech frames in which speech was absent. As an alternative to storing such a count, the stored data may take other forms, such as a dummy frame of minimal length for each unstored frame. As will be appreciated, storing speech frames only when speech is present leads to a very much more efficient use of memory space.

During long periods of absence of speech it may be desirable periodically to store in memory 116 updated SID frames, in which case the data representative of the duration of the absence of speech, such as the above-noted frame count, would be a count from the first stored SID frame to the second stored SID frame, a count from the second stored SID frame to the third stored SID frame, and so on, ending with a final stored count from the last stored SID frame to the onset of speech.

For playback operation, Record and Playback Control block 115 causes the contents of memory 116 to be sent to Audio Decode block 108'. Thus when a speech frame is retrieved from memory 116 it is sent to block 108' with the flags set to indicate speech with no errors. (At the output of Receive Chain block 107, information regarding the presence or absence of errors in the received signals is relevant for decoding purposes in block 108, but for the playback function such error information is irrelevant, and so for block 108' only the speech/SID field is used with the flags set to indicate the absence of errors). When a SID frame is retrieved from memory 116 it is sent to the Audio Decode block 108' with flags set to indicate a SID frame with no errors. The same SID frame is repeatedly sent to block 108' for a period governed by the data stored in memory 116 representative of the duration of the absence of speech, and this stored data is changed to reflect the remaining duration of absence of speech. Thus, where such data is a frame count, the count is reduced by 1 each time a SID frame is sent to block 108'. Where, as described above, during a speech absence more than one SID frame is stored in memory 116, the first SID frame is sent until the first stored count reduces to zero, then the second stored SID frame is sent until the second stored counts reduces to zero, and so on.

Referring now to FIG. 3, Audio Decode function block 108' may be, and preferably is, a second instance of already-provided Audio Decode function block 108 (FIG. 1) which, as will be understood by those skilled in the art, is normally embedded in software in the DSP (not shown) in the GSM handset. Accordingly although the description of the operation is given with reference to block 108', it will be understood that block 108 (FIG. 1) functions in a similar manner.

Speech data and flags at the input of block 108' are provided as input to a Receive DTX and Control Function block 301 which passes speech frames, indicated as such by the flags, directly to a speech decoder 302, the output of which is the output of block 108'. One or more SID frames, indicated as such by the flags, are sent to a comfort noise generator 303 which generates comfort noise whose characteristics depend upon information contained in the SID frame or frames. The comfort noise is provided to speech decoder 302 for the duration of the absence of speech as represented by the stored data in memory 116 (FIG. 1) e.g. the count of the frames during which speech was absent.

Thus the output of block 108' comprises the decoded speech frames that are stored in memory 116 (FIG. 1) with each silence interval between speech bursts containing comfort noise generated by comfort noise generator 313, in dependence on the SID frame or frames stored in memory 116, for a duration represented by the data, e.g. the frame count, stored in memory 116 representing the duration of the silence interval. Block 108' also has a Speech Frame Substitution block 304 which is not used in the playback function. It is merely a counterpart of a corresponding block in the first instance of Audio Decode block 108 (FIG. 1) where it serves to insert one or more substitute speech frames, or provide a "mute" output, if bad data is received from the Receive Chain block 107.

Referring to FIG. 1 again, the output of block 108' is fed to digital-to-analog converter 110 via switch 109. It will be appreciated that, for normal operation as a telephone, switch 109 connects the output of Audio Decode function block 108 to the input of digital-to-analog converter 110, whereas, to listen to a recording, switch 109 connects the output of Audio Decode function block 108' to the input of converter 110.

It will be appreciated that the setting of switch 114 controls what is recorded. Thus by setting switch 114 to connect the output of analog-to-digital converter 103 to the input of Audio Encode block 104', the handset can record a voice memo, or record outgoing speech during a telephone call, or record a voice prompt for prompting the user of the handset, e.g. a prompt such as "Please speak the name of the person you wish to dial now, or say "Help" for further options". With the switch 114 set to provide output from Audio Decode block 108 to the input of Audio Encode block 104', the handset can record incoming speech during a telephone call, or when acting as a telephone answering machine. When switch 114 connects the output of summer 113 to the input of Audio Encode block 104', recording of a telephone conversation, i.e. both incoming and outgoing speech, is possible.

When the invention is applied to a radio transceiver employing discontinuous transmission, various items of hardware or software that already exist in the transceiver may be "re-used". Thus, in a GSM handset all of the items shown in FIG. 1, with the exception of summer 113, switches 109 and 114, and Record and Playback Control block 115, already exist for the normal transmit and receive operations of the handset, and so the invention is particularly efficient in its re-use of such hardware and/or software.

As will be appreciated by those skilled in the art, the various items shown in FIG. 1 may be implemented in hardware or software as appropriate. Normally, microphone 101, filter 102, analog-to-digital converter 103, Radio 106, the modulation function in Transmit Chain 105, digital-to-analog converter 110, filter 111, transducer 112 and memory 116 are implemented in hardware. Other functions in the Transmit Chain 105, the Receive Chain 107, Audio Encode functions 104 and 104' and Audio Decode functions 108 and 108' are normally implemented in software in the DSP in the handset. The Record and Playback Control block 115 may be implemented in software in the DSP, or in the microcontroller 117, or in hardware.

Although the invention has been described by way of its application to a GSM phone, it will be appreciated that it will find application in other systems employing discontinuous transmission, such as PCS 1900 and IS-136 for example, and in systems where lower rate transmission occurs during periods of silence, for example as may occur in CDMA systems. The invention may also find application in so-called Voice over IP (Internet) where a GSM EFR (Enhanced Full Rate) speech coder may be used to send packet data over the internet, or a GPRS terminal able to act as a GSM terminal as well as a data terminal may be used to transfer packet data containing speech frames, a GSM speech encoder being used to encode the speech.

What is claimed is:

1. Digital communications apparatus including a comfort noise estimator for providing silence frames, a comfort noise generator for providing comfort noise for simulating background acoustic noise, and speech record/playback means adapted, on record, to store speech frames substantially only during the presence of speech, to store one or more silence frames at the end of the presence of speech, and to store data representative of the duration of the absence of speech, and adapted, on playback, to provide as output speech signals derived from the stored speech frames and, in dependence upon the stored one or more silence frames, comfort noise from the comfort noise generator for a duration represented by the stored data.

2. Apparatus as claimed in claim 1 wherein the apparatus is a digital mobile phone including a transmitter adapted to be switched on only for transmission of frames containing useful information, and, the comfort noise generator is adapted to provide comfort noise in dependence upon silence frames when no speech frames are received.

3. Apparatus as claimed in claim 2 including a speech encoder for encoding speech into speech frames and for providing input to the comfort noise estimator for providing said silence frames, whereby said speech frames stored by the speech record/playback means are those encoded by said speech encoder, and a speech decoder for decoding stored speech frames and for providing in the output of the speech decoder comfort noise generated by said comfort noise generator in dependence upon stored silence frames.

4. Apparatus as claimed in claim 2 or 3 wherein the digital mobile phone is a GSM phone.

5. Apparatus as claimed in claim 4 wherein said stored data comprises a count of speech frames occurring during he absence of speech.

6. Apparatus as claimed in claims 1, 2 or 3 wherein said stored data comprises a respective dummy frame of minimal length for each speech frame occurring during the absence of speech.

7. A method of recording/playing back speech in digital communications apparatus, the method including, for recording, storing speech frames substantially only during the presence of speech, storing one or more silence frames, containing information representative of background acoustic noise, at the end of the presence of speech, and storing data representative of the duration of the absence of speech, and, for playback, providing as output speech signals derived from the stored speech frames and, in dependence upon the stored silence frame or frames, comfort noise for simulating background acoustic noise for a duration represented by the stored data.

8. A method as claimed in claim 7 wherein said stored data comprises a count of speech frames occurring during the absence of speech.

9. A method as claimed in claim 7 wherein said stored data comprises a respective dummy frame of minimal length for each speech frame occurring during the absence of speech.

* * * * *